United States Patent [19]
Goss et al.

[11] 4,105,978
[45] Aug. 8, 1978

[54] STRETCH AND STALL CLOCK

[75] Inventors: Gary J. Goss, Acton; Thomas F. Joyce, Burlington, both of Mass.

[73] Assignee: Honeywell Information Systems Inc., Waltham, Mass.

[21] Appl. No.: 710,540

[22] Filed: Aug. 2, 1976

[51] Int. Cl.² .................... H03K 5/04; H03K 1/18
[52] U.S. Cl. ..................... 328/58; 307/265; 307/267; 307/269; 328/61; 328/65
[58] Field of Search ............ 307/215, 218, 265, 267, 307/269, 271; 328/55, 56, 58, 61, 63, 65, 74

[56] References Cited
U.S. PATENT DOCUMENTS

| 3,248,657 | 4/1966 | Turecki | 307/215 X |
| 3,418,498 | 12/1968 | Farley | 307/215 X |
| 3,628,065 | 12/1971 | Hill | 307/269 |
| 3,675,133 | 7/1972 | Frankeny et al. | 307/269 X |

Primary Examiner—John Zazworsky
Attorney, Agent, or Firm—Nicholas Prasinos; Ronald T. Reiling

[57] ABSTRACT

A system clock mechanism which can be either stalled (i.e. held indefinitely in a high state) or stretched (i.e. change the rate of pulse occurrence). A first electronic circuit provides pulses having a first predetermined pulse period $T_1$ with each pulse being generated at a first predetermined rate. A second electronic circuit cooperating with the first electronic circuit modifies the first electronic pulses to generate pulses at a second predetermined rate having a second predetermined pulse period $T_2$. A third electronic circuit cooperating with the first and second electronic circuits holds the clock circuit indefinitely in a high state.

9 Claims, 6 Drawing Figures

STRETCH AND STALL CLOCK

BACKGROUND OF THE INVENTION

1. Field of the Invention

This invention relates to computer timing circuits and more particular to a method and apparatus having the capability of generating pulses at more than one rate (i.e. stretching the pulse period of the computer clock system) or stalling the computer clock system (i.e. holding the clock system indefinitely in a high state).

2. Description of the Prior Art

For any computer manufacturing company to remain competitive it must provide features in its equipment reflecting user needs and requirements, and this equipment must be offered to the user at the lowest cost possible. Two primary demands compatible with the lowest cost have surfaced in the marketplace. One is to provide a greater "throughput capability"; while another is to provide broader capability for providing a broader spectrum of services to the user. These requirements translate into one broad general requirement —maximum data handling capabilities with minimum hardware requirements. Accordingly, the computer designer is faced with a problem of reducing the ultimate cost of the computer system and increasing capabilities of the computer system. These requirements act in opposition to each other. Generally, additional features and capabilities require increased hardware which translates to increased cost; whereas reducing costs translates into a reduced number of features and capabilities by reducing hardware.

One particular piece of hardware which is utilized in all computer systems and is additionally utilized in different portions of computer systems is the clock system of a computer system. Different portions of a computer system operate at different clock rates. For example, card readers and printers operate at one inherent rate; disk drives and tape drives operate at another rate; the main memory of a computer system operates at still another rate; whereas the central processing unit CPU operates at still another rate. As computer systems become more complex and have multiprogramming, multiprocessing and communication tasks, timing requirements also become further complex. Moreover, some computer systems operate in a synchronous slow manner; other computer systems operate in a synchronous fast manner; and still others operate in an asynchronous manner. It becomes obvious, therefore, that not only clocks with different clock rates may be required for any given computer system, but also clocks that can start and stop themselves upon command. For example, a computer system comprising a CPU and main memory requires that the CPU access main memory at a rate $R_1$ which is the cycle time of the main memory. When a tape drive is added to the system, both the CPU and main memory may be required to communicate with the tape drive at a different rate $R_2$ which is the rate of the tape drive. This would require a different clock rate. Moreover, if operation of the computer system is asynchronous (i.e. the performance of each operation starts as a result of a signal either when a previous operation has been completed, or when the parts of the computer system required for the next operation are available), the CPU clock may be required to stop itself until it receives the signal that the information is available for it. Of course, one way to handle this start-stop problem is to permit the clock to idle at its normal rate; however, when information is available at the middle of the idling cycle, it cannot be immediately received in the middle of the cycle, but must await for the beginning of the cycle. This is inefficient and causes loss of valuable computer time. Hence, it is better to stall the clock and permit immediate restart when information is available.

One obvious solution to the problem of different clock rates is to provide a different clock for each different requirement. However, as previously noted, this is incompatible with the requirements of the marketplace and competition. Another prior art solution is to provide means for slowing down or speeding up a clock system. However, since computer clock systems must also be extremely accurate and maintain their accuracy over long periods of time, this solution is not commercially practical except in some exceptional circumstances, because expensive precisely controlled oscillators are required which do not lose their accuracy when their speed is varied. This means that not only must the oscillator circuit be accurate but the control circuit must be very accurate; thus adding two expensive components instead of one.

What is required in the way of timing circuits, particularly for the cheaper, mini-computer systems which nonetheless are required to have many of the features of larger systems, is a computer clock system which can automatically provide a series of pulses which can be stretched upon request; moreover, the clock system should be capable of stalling itself to satisfy the needs of some asynchronous operations, and restarting immediately upon request.

OBJECTS OF THE INVENTION

It is a primary object of the invention therefore to provide a means for ensuring maximum data handling capabilities with minimum hardware requirements.

It is another primary object of the invention to provide an improved computer clock system.

It is still a further object of the invention to provide a clock system that can be stretched (i.e. generate pulses at more than one rate).

It is yet another object of the invention to provide a clock system which can be stalled and can subsequently be started immediately upon request.

Still another object of the invention is to provide a computer clock system which is capable of providing a series of pulses each pulse having a first predetermined pulse period $T_1$, and upon request to provide at least one other series of pulses each pulse having a second predetermined pulse period $T_2$; furthermore this clock system is to further have the capability of being held indefinitely in a high state upon command.

SUMMARY OF THE INVENTION

In accordance with the above and other objects of the invention, there is provided a system clock mechanism which can generate at least two series of pulses with each pulse in a first series of pulses having a pulse period $T_1$, and with each pulse in a second series of pulses having a pulse period $T_2$. First and second means are provided for delaying an electronic signal by a first and second predetermined amount of time respectively. A third electronic means provides a first series of square wave signals each square wave signal having a predetermined time period $T_1$ and a time duration $t_1$. A fourth electronic means cooperating with a first electronic circuit modifies the rate of generating pulses so as to provide a second series of alternating square waves, each square wave in the second series having a time period $T_2$ and a time duration $t_2$. Moreover, a fifth electronic circuit cooperating with the third and fourth electronic circuits provides for holding the computer clock system in a high state indefinitely, and restarting immediately upon request. A sixth electronic means is also provided for disabling the generation of alternating square wave signals.

DESCRIPTION OF THE PREFERRED EMBODIMENT OF THE INVENTION

General

Figure 1A:
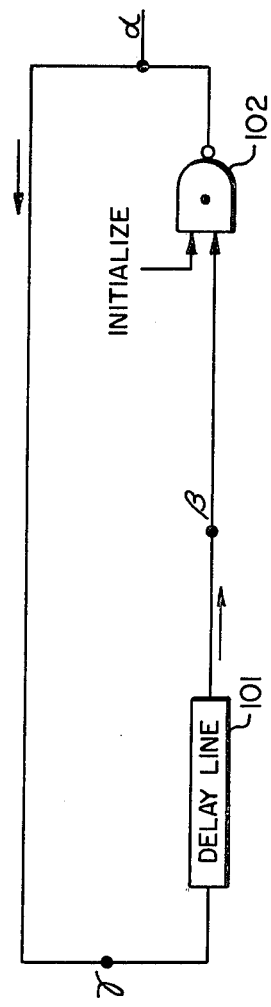
FIG. 1A is a schematic drawing of a prior art computer clock system for generating clock pulses.
Figure 1B:
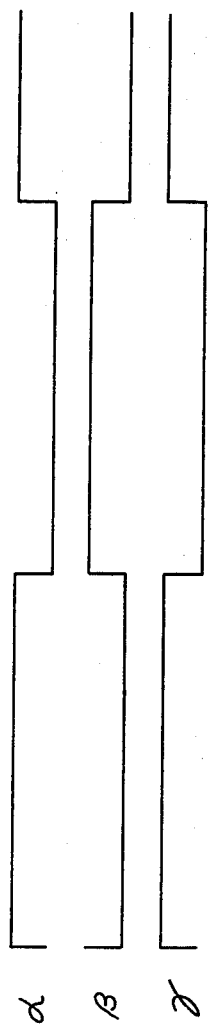
FIG. 1B is a timing diagram of the states of the prior computer clock system of FIG. 1A at various positions of the circuit.

Referring to FIG. 1A there is shown the basic prior art technique of a computer clock system for generating computer clock pulses. The basic clock system is very simple in that a delay line 101 is coupled in series with a NAND gate 102. Although other components such as power supplies are required, they are not essential in describing the basic concept of pulse generation and accordingly are not shown. Referring to FIG. 1B there is shown the timing diagrams at various positions in the schematic diagram of FIG. 1A. Assuming that delay line 101 provides a 100 nanosecond delay, the pulse forms denoted $\alpha$ on FIG. 1B are generated at position $\alpha$ of FIG. 1A. Moreover, the pulse forms denoted $\beta$ and $\gamma$ result at positions $\beta$ and $\gamma$ of FIG. 1A. Assuming that the system of FIG. 1A has just been initialized at time $\tau$ from a negative to a positive state at position $\alpha$ and $\gamma$. This is accomplished manually from some console (not shown) by causing the INITIALIZE signal on one input terminal of NAND gate 102 to go low from its normally high position. With one input low then the output goes high and stays high so long as one input is low. To completely initialize the system, the INITIALIZE signal is maintained in a low state for at least 100 nanoseconds. Since at time $\tau$ the system was initialized to a high state, positions $\alpha$ and $\beta$ will remain in the high state so long as the initialize signal remains low. Similarly, position $\beta$ will remain in the high state for at least a 100 nanosecond time interval. When the initialize signal is released, it goes high and since the other input terminal of NAND gate 102 is high, the output of NAND gate 102 will go low at positions $\alpha$ and $\gamma$. At a time interval $\tau_1 = \tau + 100$ nanoseconds, the low state of position $\gamma$ will emerge and switch position $\beta$ to a low state. This state will remain low for an additional 100 nanoseconds because of delay line 101, and will in turn be inverted to a high state during these 100 nanoseconds by NAND gate 102 whereupon at a time interval $\tau_2 = \tau_1 + 100$ nanoseconds, the high signal of position $\gamma$ will emerge from delay line 101 and change the state of position $\beta$ to a high state once again; whereupon the cycle is repeated over and over again. If it is required to have a pulse having either shorter or longer duration, it is obvious to substitute a delay line which has either a shorter or longer duration than that of delay line 101. This is generally done by adding additional circuits and cutting out the old circuit and switching in a new circuit. Not only does this scheme require additional control, but it requires additional circuits. Moreover, if it is required to keep the same pulse duration but have it repeated at a slower or faster rate, merely adding additional delay lines to the device of FIG. 1A will not accomplish this result; nor will switching in different circuits with additional delay accomplish this result.

DETAILED DESCRIPTION OF THE INVENTION

Figure 2:
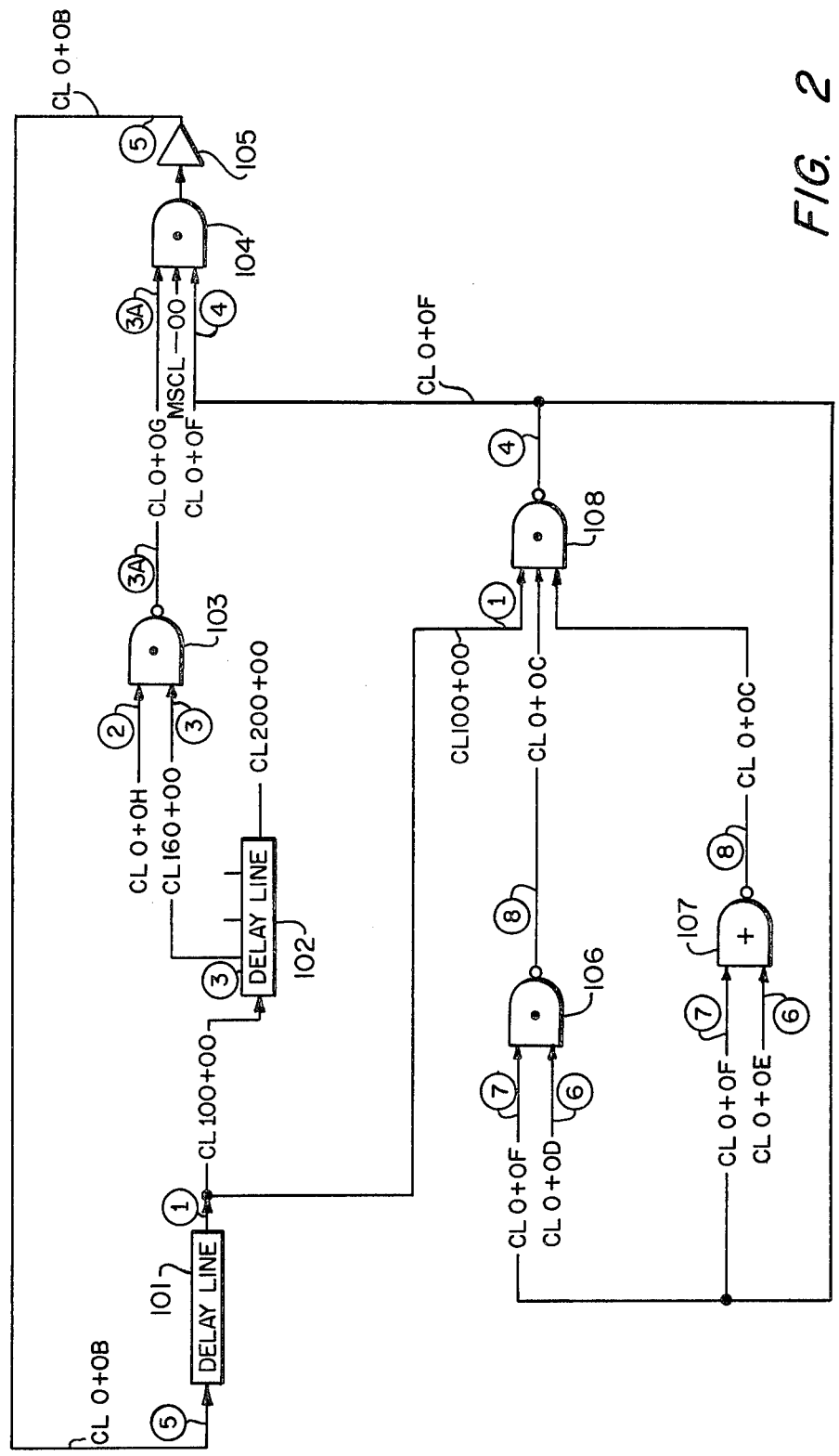
FIG. 2 is a logic block diagram of the invention.

Referring now to FIG. 2 there is shown an AND gate 104 coupled to amplifier 105 which in turn is coupled to one terminal of delay line 101. Delay line 101 provides a 100 nanosecond delay for this specific embodiment of the invention; however, a delay line may be chosen which provides any predetermined delay which the designer wishes for the basic time duration of the pulses. Another delay line 102 is coupled to a second terminal of delay line 101. Delay line 102 has several taps for providing various amounts of delay. In this embodiment, the tap at position denoted ③ provides 60 nanosecond delay, and this tape is coupled to one input terminal of NAND gate 103, thus providing a signal CL160+00 to one input terminal of NAND gate 103. A stretch signal CL0+OH is normally low and is applied to another input terminal of NAND gate 103. The output terminal of NAND gate 103 is coupled to one input terminal of AND gate 104 and provides a signal CL0+OG to AND gate 104. On a second input terminal of AND gate 104 a signal MSCL−00 is applied. The MSCL−00 signal is normally high, and is utilized to initialize the computer clock system of FIG. 2. When a user wants to clear the clock of unwanted signals (i.e. initialize the clock system), he manually depresses a switch in the computer console or panel (not shown) which changes the state of the MSCL−00 signal from high to low. Thus, AND gate 104 is disabled which in turn disables the basic computer clock system and "flushes out" any prior signals. Hence, a new cycle can be commenced from this starting point. At a third input terminal of AND gate 104 a signal CLO+OF is applied. As will be more fully described under the heading of Operation of the Invention, input signals CL0+OG and MSCL−00 will normally be high under normal operating conditions of the clock system, and AND gate 104 will be enabled and disabled in accordance with the signal CL0+OF to be described infra. At a point in the circuit between delay line 101 and delay line 102 the output terminal of delay line 101 is coupled to one input terminal of NAND gate 108. A signal CL100+00 delayed by a 100 nanoseconds is applied to this input terminal. A second input terminal of NAND gate 108 is coupled to the output terminal of NAND gate 106; and the third input terminal of NAND gate 108 is coupled to the output terminal of NAND gate 107. The output signal from NAND gates 106 and 107 CL0+OC is applied to these second and third input terminals of NAND gate 108. Of course, the output of NAND gate 108 as previously described provides a signal CL0+OF and is coupled to an input terminal of AND gate 104. NAND gates 106 and 107 perform the same basic function — that of stalling the clock. The reason more than one NAND gate is used is that the command for a stall may come from a different unit; hence stall signal CL0+OD on NAND gate 106 may come from the main memory, whereas stall signal CL0+OE on NAND gate 107 may come from the tape drive. It should be understood that as additional units are added to the system, additional NAND gates similar to 106 and 107 would be utilized to receive the command for stalling the clock. An input signal CL0+OD which represents the timing command for stalling clock 106 is applied to one terminal of NAND gates 106. On a second input terminal of NAND gate 106, a signal CL0+OF is applied and represents the feedback signal from the output of NAND gate 108. Similarly, a command signal CL0+OE which is normally high is applied to one terminal of NAND gate 107, whereas the feedback signal CL0+OF is applied to a second terminal of NAND gate 107. Referring again to AND gate 104, when it is enabled, the output signal is amplified in amplifier 105 and provides an amplified signal CL0+OB which is then applied to the input of delay line 101.

Since AND gates, NAND gates, amplifiers and delay lines are well known to the prior art, the structure of the invention has been adequately disclosed and accordingly the operation of the invention and its various features will now be described.

OPERATION OF THE INVENTION

Referring now to FIG. 2, the normal operation of the invention will first be described. For this embodiment, pulses having a positive state of 100 nanoseconds and a negative state of 100 nanoseconds or a pulse period T of 200 nanoseconds are generated. However, it should be understood that by proper choice of delay line, pulses having any other period may also be generated.

Briefly, the stretch circuit may be visualized as one AND gate 104 with two NAND gates 103 and 108 in parallel and with the output of each NAND gate applying input signals to AND gate 104. The third input signal to AND gate 104 for purposes of generating "the stretch pulses" can be disregarded as it is always high except during initialization. From a given common point then, input signals are directed to both NAND gates 103 and 108. The input signal to NAND gate 103 is delayed by a total of 160 nanoseconds whereas the input signal to NAND gate 108 is delayed by only 100 nanoseconds. Under normal operation, the output of NAND gate 103 is caused to be high, as will be more fully described infra; and thus the controlling gate is NAND gate 108 which will generate alternate high and low pulses of 100 nanoseconds. By some "stretch demand signal", to be more fully described infra, NAND gate 103 is switched into the stretch circuit and becomes operative. Then in order to enable and disable AND gate 104 the cooperation of both output signals from NAND gate 103 and 108 is required, since the output signal from NAND gate 103 will not constantly remain high. Assuming that AND gate 103 is switched to the circuit by a "stretch signal" just when the output of AND gate 104 has gone low. Under normal operation this output of AND gate 104 would turn high 100 nanoseconds later because the output of NAND gate 108 would go high at that time. However, since NAND gate 103 is operative, it doesn't go high for an additional 60 nanoseconds because of the additional delay, and accordingly the output of AND gate 104 remains low for 160 nanoseconds. However, with the output low, which is then fed again to each input of NAND gates 103 and 108, NAND gate 103 is ineffective as a control in that its output will remain high so long as its input is low, and control reverts to NAND gate 108. NAND gate 108 operation is delayed by 100 nanoseconds since it is tied directly to delay line 101 and will generate a 100 nanosecond positive signal which is applied to AND gate 104 thus generating a positive signal of 100 nanoseconds. This process is repeated over and over again alternately generating a low signal of 160 nanoseconds and a high signal of 100 nanoseconds. A more detailed description of the "stretch" operation together with the timing diagrams is presented below.

As previously noted, input signal MSCL−00 applied to one terminal of AND gate 104 is normally high. Also, in normal operation since the "stretch signal" CL0+OH is normally low, the output signal CL0+OG of NAND gate 103 is normally high regardless of what the other input signal CL160+00 to NAND gate 103 is. Accordingly, a second high input signal CL0+OG is applied to a second input terminal of AND gate 104. With both of these input signals high, AND gate 104 is enabled and disabled by the state of the third input signal CL0+OF to AND gate 104. However, prior to the commencement of generation of clock signals, the clock circuit is initialized by causing the state of input signal MSCL−00 to go low. As was previously described, this is done by depressing a switch in the console or panel (not shown). This disables AND gate 104, regardless of the state of the other input signals, and accordingly, "flushes out" previous signals in the clock circuit.

Thus, with this as an initial condition, when the manual switch on the console or panel is allowed to return to its normal state, two of the input signals CL0+OG and MSCL−00 will be normally high. The third signal CL0+OF will also be in the high state because CL100+00 applied to NAND gate 108 is low and hence the output signal CL0+OF is high. Hence, the output signal CL0+OB of amplifier 105 will be applied to delay line 101 and will be high. One hundred nanoseconds later, signal CL100+00 which is in the high state will be applied to one terminal of NAND gate 108. Another input signal CL0+OC will be applied to the other input terminals of NAND gate 108. It should be noted that for this embodiment, the CL0+OC input signal is derived from two NAND gates 106 and 107 and is applied to two separate input terminals of NAND gate 108. It could have been derived from any number of NAND gates. NAND gates 106 and 107 have at least one input signal CL0+OD or CL0+OE applied respectively to each of NAND gates 106 and 107 and represent a request signal for stalling the clock. It should be understood that a request signal for stalling the clock may originate in the main memory, and may be received by NAND gate 106; or, a request for stalling the clock may originate in the tape drive, and may be received by NAND gate 107. Similarly, requests from other units such as card readers, printers, etc. may be initiated and received by their own individual NAND gates similar to 106 or 107. With the request signals CL0+OD and CL0+OE normally low, at least one input terminal on each of NAND gates 106 and 107 is low, and accordingly the output terminals on these gates is high regardless of whether the other input signals on NAND gates 106 and 107 are low or high. Hence, the CL0+OC input signal on the two input terminals of NAND gate 108 are high. However, as previously noted, the CL100+00 signal is high. Accordingly, the output signal CL0+OF of NAND gate 108 will be low. This signal is applied to the third input terminal of AND gate 104 thus disabling AND gate 104. The low output signal from AND gate 104 is passed through amplifier 105 and is then applied to delay line 101. This signal will remain low for 100 nanoseconds whereupon it will go high, because at that instant, input signal CL100+00 to NAND gate 108 will go low thus enabling NAND gate 108 and applying a high signal CL0+OF to AND gate 104. This cycle is repeated until either a "stretch signal" CL0+OH is received at position 2 of the circuit, or else "stall signal" CL0+OD or CL0+OE is received at position ⑥ of the clock circuit.

Figures 3A, 3B:
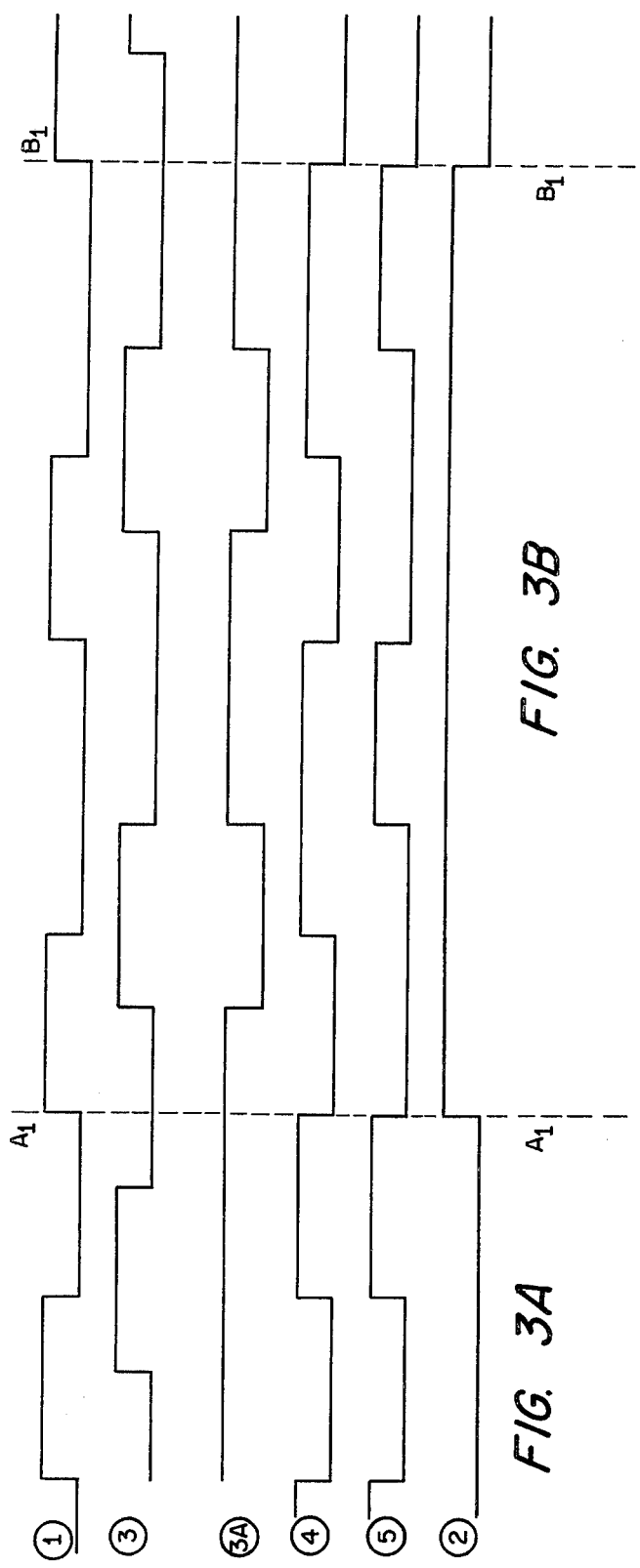
FIGS. 3A and 3B are timing diagrams of a feature of the invention providing modified pulses of longer pulse periods.

Referring now to FIGS. 3A and 3B, the "stretch" operation of the invention will be described where a series of pulses are generated as shown on diagram ⑤ of FIG. 3B. FIG. 3A shows the timing diagrams for at least one cycle of normal operation as previously described supra before the stretch signal CL0+OH goes high. It should be noted that the numbers in a circle on FIGS. 3A, 3B and 4, identify the timing diagrams at various positions on FIG. 2 which are also identified by the same number in a circle. Hence, it will be noted by inspecting FIG. 3A that when the stretch signal CL0+OH at position ② is low the invention operates in its normal mode as previously described and as shown on FIG. 3A for at least one cycle. Hence at point ① two 100 nanosecond pulses are shown one being high, the other one being low. Diagram ③ shows the pulses of diagram ① delayed by 60 nanoseconds. Diagram ③A shows that the output of NAND gate 103 remains high so long as diagram ② representing the point at which the stretch signal is applied is low. Diagram ④ when the "stall" signal is inoperative, is the inverse of diagram ① because of the inversion of the signal of NAND gate 108. Hence, as previously noted in the discussion supra, with signals CL0+OG at point ③A and initiate signal MSCL−00 high, AND gate 104 is enabled and disabled by the output signal CL0+OF of NAND gate 108 which is applied as an input signal to AND gate 104 at position ④. Hence, under normal operation, the diagram ⑤ provides 100 nanosecond pulses in accordance with the oscillation of diagram ④.

Now for ease of explanation, assume that a stretch signal CL0+OH is applied at position ② of FIG. 2 at a point in time denoted by $A_1A_1$ on FIG. 3A. Up to the time that this signal went high, the output signal of NAND gate 103 at position ③A was high. Now, however, it will oscillate in accordance to input signal CL160+00 at position ③ but in an inverse fashion. Signal CL160+00 at position ③ will however follow signal at position ① but delayed by 60 nanoseconds. Let us see therefore, what happens to signal at position ① When the stretch signal goes high, its effect will not be immediately felt at position ① There it will be noted that the state had changed from low to high and would continue to be high for at least 100 nanoseconds because a high signal was applied at the input to delay line 101, 100 nanoseconds earlier. After 100 nanoseconds have elapsed, the signal at position ① would go low. Meanwhile the signal at position ③ would not go low for at least 60 nanoseconds later. When the signal at position ③ goes low, then the signal in position ③A goes high. When the signal at ③A goes high, the signal at position ① has been low for at least 60 nanoseconds. This high signal is applied as one input of AND gate 104 and is high. As previously noted, MSCL−00 applied to another terminal of AND gate 104 is normally high. Hence, two input signals on AND gate 104 are high. Also, at this point it should be noted that the signal at position ④ is high, since it is the output of NAND gate 108, and since the input CL100+00 at position ① of NAND gate 108 is low. Thus, with all inputs to AND gate 104 enabled, signal CL0+0B at the output of amplifier 105 at position ⑤ will go high. This high signal is applied to the input of delay line 101 and emerges 100 nanoseconds later at position ① Accordingly, during this period, position ① has been in a low state for 160 nanoseconds — the 60 nanoseconds previously noted and the 100 nanoseconds that it took the high state to emerge at position ① This pattern will be repeated over and over again for the state of the signal at position ① As previously noted, the state of the signal at position ③ will be similar to that of the signal at position ① but delayed by 60 nanoseconds. The state of the signal at position ③A will be the inverse of the signal at position ③ since with the "stretch signal" high on NAND gate 103 the output will follow the other input signal but in an inverse fashion. The signal at position ④ will be the inverse of the signal at position ① since the signal at position ① is applied as one input to NAND gate 108 the output of NAND gate 108 at position ④ will be in the inverse of the input at position ① when the other inputs are high. Hence by inspection of FIG. 3B, the states of the signal at position ⑤ can be derived by observing the states of the signal at positions ③A and ④ since they are two of the three inputs on AND gate 104 and the third input is normally high. Hence these two inputs are controlling. By inspecting FIG. 3B it will be noted that when both diagrams ③A and ④ are high, the state of the signal at position ⑤ will be high, and conversely when the input positions ③A or ④ are low, the output at position ⑤ will also be low. It will be seen therefore that at position ⑤ the signal remains in the high state for 100 nanoseconds and in the low state for 160 nanoseconds. This condition will be repeated over and over again until the "stretch signal" is removed hence the 100 nanosecond high signal has been stretched out by 160 nanoseconds.

Referring now to FIG. 2, and the timing diagrams of FIG. 4, the stall feature of the invention will be described by first describing the invention without the stall and creating a stall condition, and then getting out of the stall condition. Diagram number 1 shows four alternations up to dotted line D, D1 of normal operation of the clock wherein alternate high and low 100 nanosecond pulses are generated. Diagram ④ also shows four alternations of the state of this signal of the clock at position ④. It should be noted that the states of signal CL0+OF at position ④ are the inverse of signal CL100+00 at position ① This is so because NAND gate 108 inverts signal CL100+00. As previously described supra, during normal operation of the clock when there is no stall request, all stall request signals CL0+OD and CL0+OE at position ⑥ at one input terminal each of NAND gates 106 and 107 respectively are low; accordingly, the output signals from NAND gates 106 and 107 at position ⑧ are high and are applied as input signals to NAND gate 108. With these signals high, the output of NAND gate 108 alternates in accordance with the input signal CL100+00 but in inverse relation as previously described. On diagram ⑥ there is a request to stall the clock when one of the request signals (it does not matter which) either CL0+OD or CD0+OE at position ⑥ goes high. An important property of this circuit is that there is no timing restriction on the occurrence of a stall request. This is due to the feedback from gate 108 to gates 106, 107 etc. Thus, if a request occurs while ④ is low (at any instant during the low interval) the effect is delayed until ④ is high. Also, if a request occurs while ④ is high (at any instant during the high interval) it is soon enough since the resultant low out of 106/107 simply reinforces the concurrent low from 101. Assuming for the purposes of this discussion that the signal is received by NAND gate 106 and it is input signal CL0+OD that goes high. (It should be understood that it makes no difference to the end result if the stall signal on NAND gate 107 were to become active). The other input signal CL0+OF at position ⑦ of NAND gate 106 is derived from the output of NAND gate 108 at position ④ which is fed back to the input of NAND gate 106. When the stall signal CL0+OD at position ⑥ goes high the other input signal of NAND gate 106 CL0+OF at position ⑦ is low as shown on diagram ④ of FIG. 4. Hence the output of NAND gate 106 at position ⑧ remains low until the output of NAND gate 108 at position ④ goes high and is applied as an input to NAND gate 106. When this happens, one alternation later, the output of NAND gate 106 at position ⑧ goes low and is applied as one input signal of NAND gate 108. With one input low on NAND gate 108, its output at position ④ goes high and is applied as a high input to NAND gate 106 at position ⑦. With two high inputs on NAND gate 106, the output at position ⑧ of NAND gate 106 is low and remains low, and is applied as an input signal CL0+OC to NAND gate 108 which holds the output signal of NAND gate 108 high indefinitely until the stall signal at position ⑥ of NAND gate 106 is removed. As previously described, in normal operation of the clock two input signals CL0+OG and MSCL−00 to AND gate 104 are high; accordingly, when the output signal CL0+OF of NAND gate 108 is applied as a high input signal to AND gate 104, it goes high and remains high indefinitely until the stall signal is removed. Hence the output position of amplifier 105 at point ⑤ latches high and stays high until the stall signal is removed. It can be readily appreciated that there is no timing restriction on the occurrence of a stall request. This is due to the feedback from gate 108 to gates 106, 107, etc.

Figure 4:
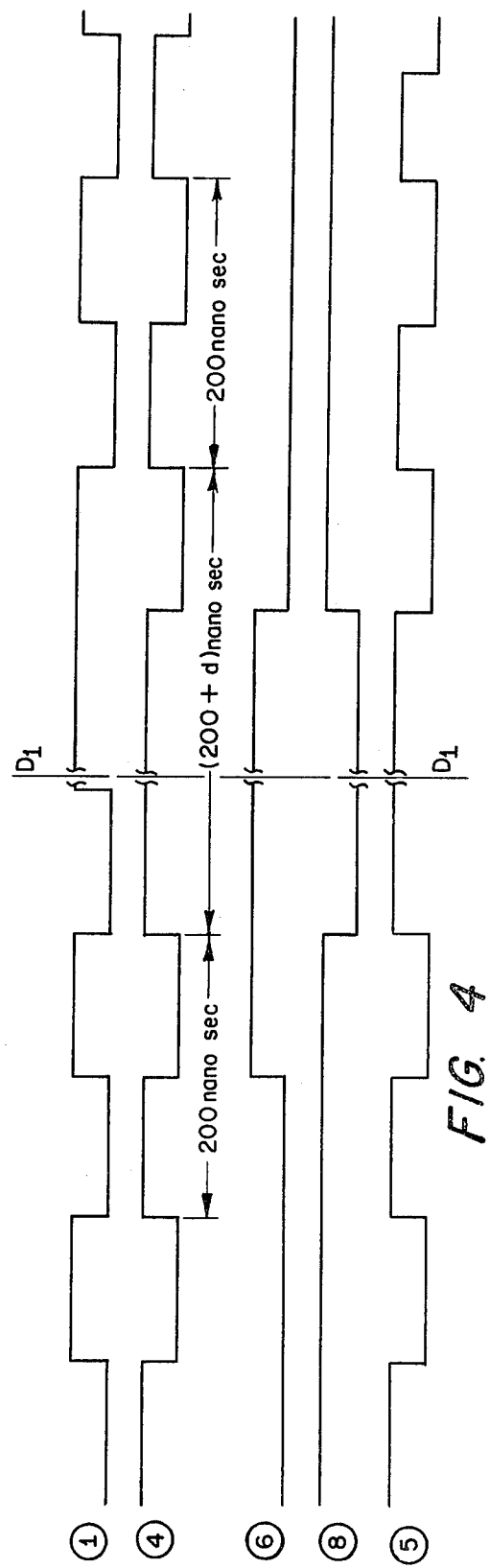
FIG. 4 is a timing diagram of a feature of the invention which holds the clocking system of FIG. 2 in a high state for an indefinite time period.

Some time period after the dotted line $D_1D_1$ on FIG. 4 the stall signal CL0+OD at position ⑥ of NAND gate 106 is removed as shown on diagram ⑥ of FIG. 4. Immediately the output of NAND gate 106 at position ⑧ goes high as shown on diagram ⑧. Hence all input signals to NAND gate 108 are high and accordingly the output signal CL0+OF of NAND gate 108 at position ④ immediately goes low and is shown on diagram ④. This in turn will be applied as an input signal to AND gate 104 at position ④ and will cause the output of AND gate 104 and amplifier 105 at position ⑤ to go low as shown on diagram ⑤. This output signal CL0+OB at position ⑤ is then fed through delay line 101 and the normal cycle of the clock begins all over again and the output of NAND gate 108 at position ④ oscillates inversely to the output of delay line 101 at position ①, which in turn causes the input signal CL0+OF to AND gate 104 to alternate as shown by diagram ④ after the stall signal has been released on NAND gate 106. Hence position ⑤ will oscillate alternately generating high and low 100 nanosecond pulses as shown on FIG. 4.

We claim:

1. A stretch and stall clock circuit means comprising:
   (a) a first electronic means for delaying an electronic signal by a first pre-determined amount of time;
   (b) a second electronic means coupled to said first electronic means for delaying the electronic signal by a second pre-determined amount of time;
   (c) a third electronic means coupled to said first electronic means for generating first alternating square wave signals having a pre-determined time period $T_1$; and
   (d) a fourth electronic means coupled to said first, second, and third electronic means and responsive to a first request signal for increasing the time period $T_1$ of the first alternating square wave signals by a pre-determined amount.

2. The stretch and stall clock as recited in claim 1 including a fifth electronic means coupled to said third electronic means and responsive to a second request signal, said fifth electronic means for stalling said stretch and stall clock in a high state.

3. The stretch and stall clock as recited in claim 2 wherein said fourth electronic means includes a NAND gate responsive to the first request signal for electronically coupling said first electronic circuit to said second electronic circuit.

4. The stretch and stall clock as recited in claim 3 including in said fifth electronic means a NAND gate responsive to the second request signal for disabling the generation of alternating square wave signals.

5. The stretch and stall clock circuit as recited in claim 4 including in said fifth electronic means a second NAND gate responsive to a third request signal for disabling the generation of the first alternating square wave.

6. The stretch and stall clock circuit comprising:
   (a) an AND gate;
   (b) a first circuit coupled to said AND gate and including a first NAND gate responsive to a stretch request signal for enabling said first NAND gate in a high electrical state when said stretch request signal is low;
   (c) a second circuit coupled to said first circuit for delaying an electronic signal by a first pre-determined amount;
   (d) a third circuit coupled to said second circuit for delaying the electronic signal by a second pre-determined amount;
   (e) a fourth circuit coupled to said second and third circuits and to said AND gate and including a second NAND gate for electronically coupling and decoupling said third circuit to said AND gate.

7. A stretch and stall clock as recited in claim 6 including at least one fifth circuit coupled to said fourth circuit and responsive to a stall signal for stalling said stretch and stall clock in a low electrical state.

8. A stretch and stall clock as recited in claim 7 including in said at least one fifth circuit a NAND gate.

9. A stretch and stall clock circuit means comprising:
   (a) a first electronic means for delaying an electronic signal by a first pre-determined amount of time;
   (b) a second electronic means coupled to said first electronic means for delaying the electronic signal by a second pre-determined amount of time;
   (c) a third electronic means coupled to said first electronic means for generating first alternating square wave signals having a pre-determined time period $T_1$;
   (d) a fourth electronic means coupled to said first, second, and third electronic means and responsive to a first request signal for increasing the time period $T_1$ of the first alternating square wave signals by a pre-determined amount;

(e) a fifth electronic means coupled to said third electronic means and responsive to a second request signal, said fifth electronic means for stalling said stretch and stall clock in the low state; and, (f) sixth means in said fifth electronic means responsive to the second request signal for disabling the generation of alternating square wave signals.

* * * * *